United States Patent
Berdanier (12)

(10) Patent No.: US 6,362,872 B1
(45) Date of Patent: Mar. 26, 2002

(54) SINGLE APERTURE THERMAL IMAGE/LASER

(75) Inventor: Barry N. Berdanier, Dallas, TX (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 07/386,792

(22) Filed: Jul. 25, 1989

Related U.S. Application Data

(63) Continuation of application No. 07/082,921, filed on Jul. 28, 1987, now abandoned, which is a continuation of application No. 06/644,602, filed on Aug. 27, 1984, now abandoned.

(51) Int. Cl.[7] .................... G01C 3/08; H01L 25/00; G02B 26/10; F41G 1/32
(52) U.S. Cl. ................... 356/4.01; 250/332; 250/334; 89/41.06
(58) Field of Search ............... 89/41.06; 356/4, 356/5, 4.01, 5.01; 250/332, 334

(56) References Cited

U.S. PATENT DOCUMENTS

| | | | |
|---|---|---|---|
| 3,698,812 A | * 10/1972 | Nelson ........................ | 356/5 |
| 3,856,402 A | * 12/1974 | Low et al. .................... | 356/5 |
| 4,380,391 A | * 4/1983 | Buser et al. .................. | 356/5 |
| 4,386,848 A | * 6/1983 | Clendenin et al. ............ | 356/5 |
| 4,457,621 A | * 7/1984 | Harris et al. ................. | 356/5 |
| 4,561,775 A | * 12/1985 | Patrick et al. ................ | 356/5 |

* cited by examiner

Primary Examiner—Stephen C. Buczinski
(74) Attorney, Agent, or Firm—Baker Botts L.L.P.

(57) ABSTRACT

Method and device for thermal imaging and rangefinding. In one form the device comprises an optical system including a first aperture and first, second and third optical paths each passing through the first aperture. A polarizer positioned to segregate the first and second optical paths is capable of receiving polarized radiation reflected from the target and transmitted through all portions of the first aperture stop. A polarization modifier is positioned between the first aperture and said polarizer; and a beam splitter, sensitive to spectral differences between the polarized radiation and the thermal radiation, is positioned along the first optical path between the first aperture and said polarizer.

According to the method thermal imaging and rangefinding functions are performed with a single aperture system by forming first, second and third optical paths each having a common portion passing through an aperture with a stop of predetermined size, at least one of the optical paths capable of traversing the entire aperture stop. Linearly polarized radiation of predetermined orientation is injected into the first path and transmitted through the aperture toward a target. Polarized radiation reflected from the target is received through the aperture into the second path. Thermal radiation which can be processed to form an image is received through the aperture into the third path.

40 Claims, 3 Drawing Sheets

SINGLE APERTURE THERMAL IMAGE/LASER

This application is a Continuation of application Ser. No. 07/082,921, filed Jul. 28, 1987 abandoned which is a continuation of application Ser. No. 06/644,602, filed Aug. 27, 1984, now abandoned.

BACKGROUND OF THE INVENTION

This invention relates to optical devices and more particularly to a single aperture thermal imager/laser rangefinder.

In the past either separate devices have been used for infrared imaging and laser rangefinding or separate optical channels have been used—one to transmit laser energy and one to channel the incoming infrared energy and laser energy to a shared array of energy detectors. The latter arrangement was an improvement over the first arrangement in that it permitted common usage of some of the signal detection and processing components which resulted in some space, weight and cost reduction. Nevertheless, these space, weight and cost reduction factors could be maximized with the combining of the optical channels. Those persons skilled in the art considered performance degradation of the infrared imager a serious deterrent to combining the optical channels of these devices.

SUMMARY OF THE INVENTION

According, it is an object of this invention to provide a single aperture thermal imager/laser rangefinder.

Another object of the invention is to provide a single aperture thermal imager and laser rangefinder which provides for substantially increased space and weight savings and cost savings.

A further object of the invention is to provide a single aperture thermal imager and laser rangefinder having minimal performance degradation.

Briefly stated the invention comprises the integration of a laser rangefinder with a thermal imager such that they both share the same telescope thereby making the invention a single aperture system. Intergration is made possible through the use of a narrow bandpass beam splitter to separate the laser energy from the thermal imagers bandpass. The performance of the thermal imager is only slightly degraded by splitting out a small section of its bandpass for the laser rangefinder, while the rangefinder's performance suffer's no degradation.

Other objects and features of the invention will become more readily apparent from the following detailed description when read in conjunction with the accompanying drawings, in which:

DESCRIPTION OF THE PREFERRED EMBODIMENT

Figure 1:
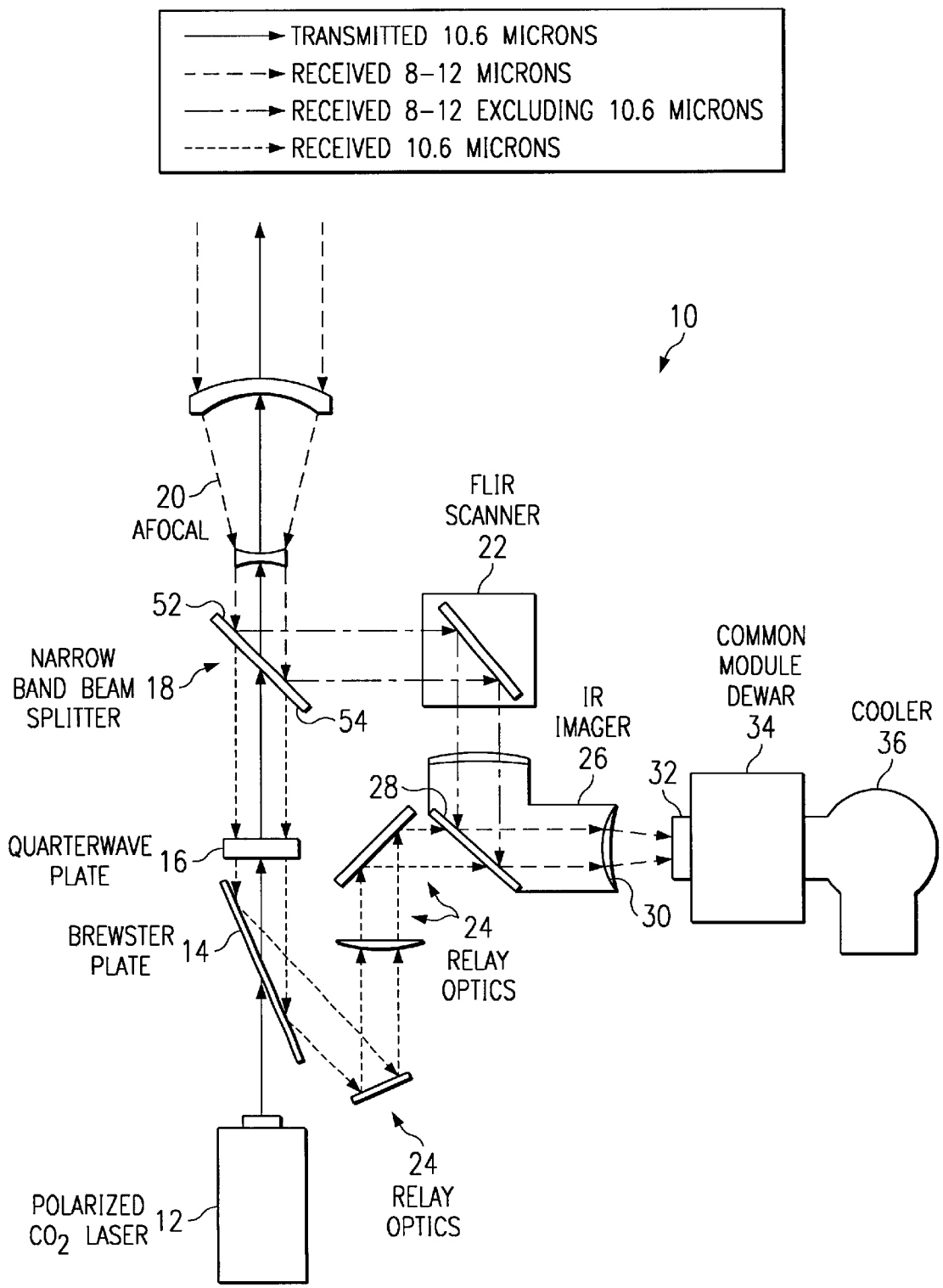
FIG. 1 is diagram of a first embodiment of the single aperture thermal image/laser rangefinder.

FIG. 1 illustrates a first embodiment of the single aperture thermal imager and laser rangefinder 10 in which the thermal detector is used as the laser detector. A laser 12, which is for example, a carbon dioxide ($CO_2$) laser having a 10.6 micron operating frequency, transmits a polarized beam to a Brewster plate 13. Because the rangefinder is coaxial, a polarized laser beam is used to separate the transmitted beam from the return beam.

The Brewster plate 14 is oriented to transmit only beams polarized in the same direction as the laser's polarization. Thus beams polarized orthogonally to the laser beam are reflected; it is this mechanism that is used to separate the transmit and return beams.

The laser beam passes through the Brewster plate 14 to a quarterwave plate 16. The quarterwave plate 16 converts the polarized laser beam from linear to circular polarization, i.e. the direction of polarization rotates as the beam propagates.

From the quarterwave plate 16 the laser beam passes through a narrow band, separation, beam-splitter 18 and on out through the afocal lens system 20.

When the beam strikes a target it is reflected and the return energy is received throught the afocal lens system 20. As the afocal lens system also receives 8 to 14 micron thermal energy emanating from the target the two have to be separated. The beam-splitter 18 performs this function by reflecting the incoming thermal energy to a scanner 22 and transmitting the laser return energy through the quarterwave plate 16 to the Brewster plate 14. The quarterwave plate 16 converts the energy from circular to linear polarization and the Brewster plate 14 reflects the linear polarized energy which is now largely orthogonal to the transmitted energy through a series of relay optics 24 to a thermal imager 26.

The thermal imager 26 includes a 45 degree narrow band, recombination beam-splitter 28 which is similar in construction to the beam-splitter 18. The recombination beamsplitter passes the laser return energy and reflects the incident thermal energy from the scanner 22 to thus combine the laser thermal energy for imaging by converging lens 30 onto the detector array 32 in the Dewar 34. The Dewar 34 is cooled either by a closed cycle cooler (refrigerator) or an open cycle cooler 36(Cryostat).

The relay optics 24 can be adjusted so that the return laser energy images on only one detector in the detector array 32. A preamplifier (not shown) processes the return laser energy to a gain sufficient for rangefinder can still be used by the thermal image and no degradation of the thermal imager will result. Although the embodiment teaches for disclosure purposes only the reflection of the IR energy and passage of the laser energy, the reverse situation is considered to be within the scope of the invention.

Figure 2:
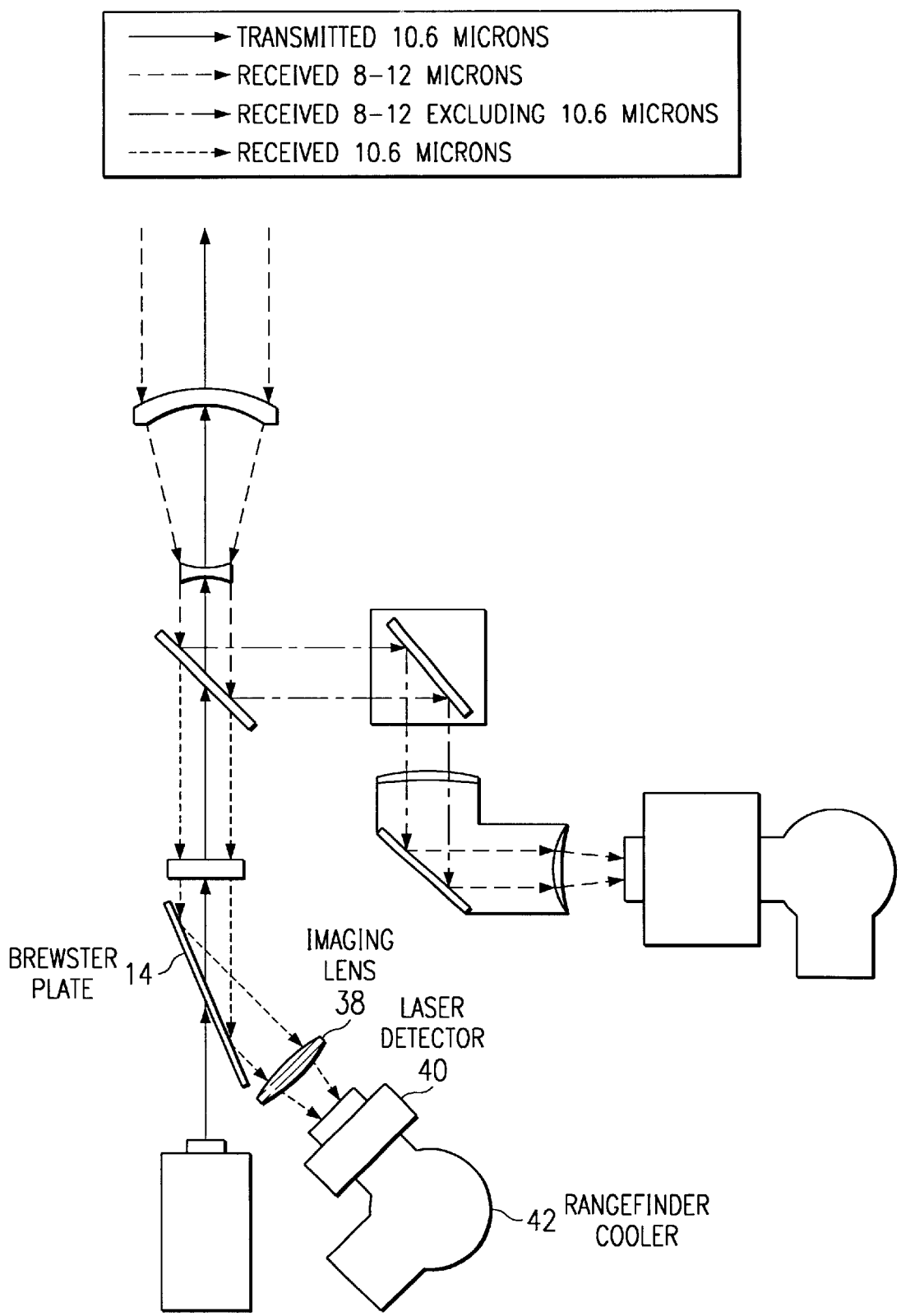
FIG. 2 is a diagram of a second embodiment of the invention.

Referring now to FIG. 2 which shows a second embodiment using a separate detector and cooler for the laser return energy, the laser energy is reflected by the Brewster plate 14 through an imaging lens 38 for focusing onto a laser energy detector 40 cooled by rangefinder cooler 42. In-as-much as the remaining structure is identical to that of the first embodiment it will not be repeated.

Although the second embodiment doesn't have the advantage of using the preexisting thermal detector and cooler, it does allow the use of a detector whose frequency response is better matched to the laser pulsewidth which gives the system more sensitivity.

Figure 3A:
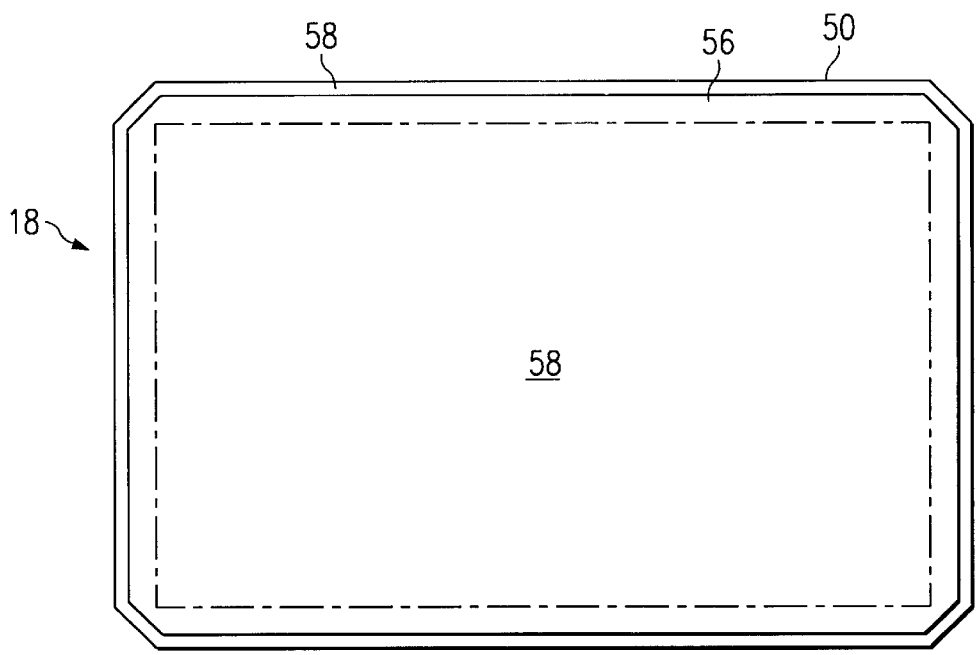
FIGS. 3a and 3b are, respectively, front and side views of the beamsplitter (filter) of the single aperture thermal imager/laser rangefinder.
Figure 3B:
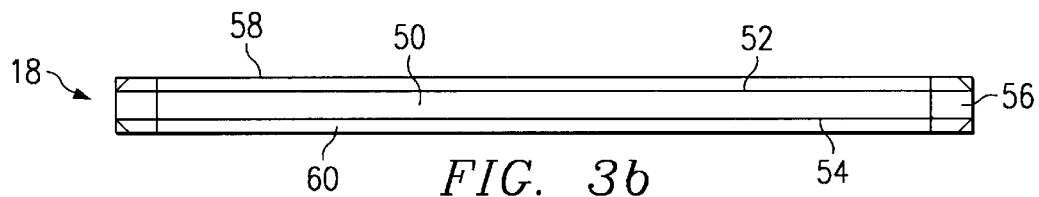

Referring now to FIGS. 3a and 3b, the beam-splitter 18 includes a Germanium base having a thickness of about 0.222 inches (5.60 mm) having polished surfaces 52 and 54 of infinite radii and an as generated border 56 having chamferred edges 58. Sides 52 and 54 (FIGS. 1, 2, & 3b) are coated; the coating 58 of side 52 is critical, while the coating 60 of side 54 is an anti-reflective coating for 10.6 microns at 45 degree incidence.

Figure 4A:
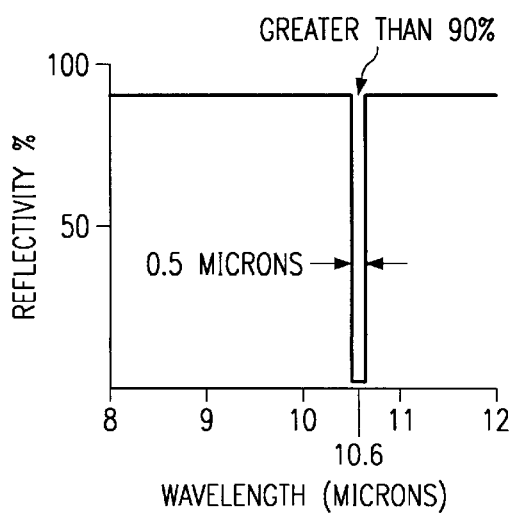
FIGS. 4a and 4b are, respectively, front and side transmission curves for the beamsplitter.
Figure 4B:
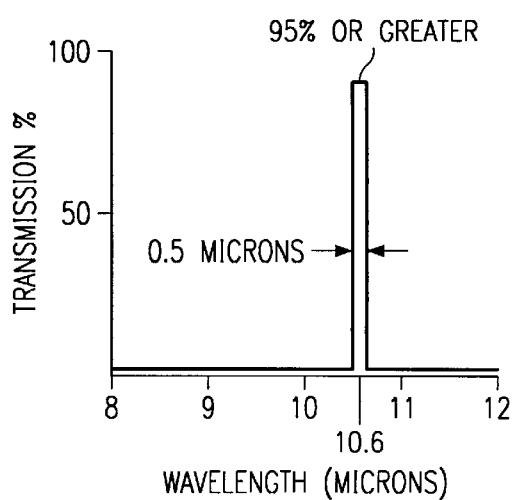

The transmission and reflectivity at 45 degree incidence for side 52 coating 58 are listed in FIGS. 4a and 4b. The coating provides for 85% transmission for an average of S and P polarizations in a 0.5 micron bandpass centered at 10.6 microns and for 90% average reflectivity from 8.0–10.4 microns and 10.8–12.0 microns average of both planes of polarization at 45 degree incidence. Thus, the filter reflects the thermal bandpass of 8–12 microns with the exception of a 0.5 micron bandpass centered at 10.6 microns. The reflectivity at 10.6 microns is less than 5% and as shown substantially all of the remainder of the 10.6 micron bandpass is transmitted.

Although several embodiments of this invention have been described, it will be apparent to a person skilled in the art that various modifications to the details of construction shown and described may be made without departing from the scope of the invention.

What is claimed is:

1. A thermal imaging and rangefinding device comprising:
    an optical system including a first aperture having a stop of predeterminable size, said system including a first optical path for transmitting polarized radiation toward a target, a second optical path for receiving polarized radiation reflected from the target and a third optical path for receiving thermal radiation which can be processed to form an image, the first, second and third optical paths each passing through the first aperture;
    a polarizer positioned to segregate the first and second optical paths, said polarizer capable of receiving polarized radiation reflected from the target and transmitted through all portions of the first aperture stop;
    a polarization modifier positioned along the first and second optical paths and between the first aperture and said polarizer; and
    a beam splitter, sensitive to spectral differences between the polarized radiation and the thermal radiation, positioned along the first optical path and between the first aperture and said polarizer.

2. The device of claim 1 wherein the optical system further includes a telescopic system formed in conjunction with the aperture.

3. The device of claim 1 wherein:
    the optical system is adapted to receive radiation linearly polarized in a first direction for transmission along the first optical path; and
    said polarizer is oriented to transmit radiation polarized in the first direction while reflecting along the second optical path radiation which is linearly polarized in a direction orthogonal to the first direction.

4. The device of claim 3 wherein the polarization modifier is positioned to convert linearly polarized radiation transmitted along the first optical path into circularly polarized radiation and to convert circularly polarized radiation transmitted along the second optical path into radiation linearly polarized in a direction orthogonal to the first direction.

5. The device of claim 1 wherein said polarizer is a Brewster plate.

6. The device of claim 1 wherein the modifier is a quarter waveplate.

7. The device of claim 4 wherein said polarizer is a Brewster plate and the modifier is a quarter waveplate.

8. The device of claim 1 arranged such that linearly polarized radiation of a first orientation, which is transmitted through the polarization modifier along the first optical path, reflected by the target and retransmitted through the polarization modifier along the second optical path, is linearly polarized in a direction orthogonal to the first orientation.

9. The device of claim 1 wherein said polarizer is a plate oriented at an angle with respect to the first optical path to separate reflected polarized radiation being transmitted along the second optical path from the first optical path.

10. The device of claim 2 wherein the telescopic system is an afocal refractive system.

11. The device of claim 10 wherein the telescopic system is transmissive to infrared radiation.

12. The device of claim 1 wherein:
    the first, second and third optical paths are transmissive to infrared radiation; and
    the beam splitter predominately transmits radiation in a 0.5 micron bandwidth centered about a wavelength of 10.6 microns while predominately reflecting other radiation ranging from 8 to 12 microns in wavelength.

13. The device of claim 1 wherein the beam splitter is oriented at a 45 degree angle with respect to the first optical path to separate thermal radiation being transmitted along the third optical path from the polarized radiation.

14. The device of claim 1 wherein the beam splitter is oriented at an angle with respect to the first and second optical paths to segregate the third optical path from the first and second optical paths by reflecting thermal radiation which differs spectrally from the polarized radiation, said device further comprising:
    an infrared imaging section positioned along the third optical path, said section including an infrared detector array and imaging optics positioned in the third optical path between the beam splitter and the detector array.

15. The device of claim 14 wherein the detector array includes a detector element for receiving polarized radiation reflected from the target.

16. The device of claim 15 further comprising relay optics positioned in the second optical path between said polarizer and the imaging optics, radiation passing along the second or third optical paths and through the focal plane optics being focused about the detector array.

17. The device of claim 14 wherein the infrared imaging section further comprises:
    a scanner positioned along the third optical path; and
    a recombination beam splitter positioned in cooperation with the imaging optics to reflect thermal radiation transmitted from the scanner onto detector elements in the array, said recombination beam splitter also positioned in the second optical path to transmit polarized radiation reflected from the target onto a detector element.

18. The device of claim 14 wherein:

the optical system is adapted to receive radiation linearly polarized in a first direction for transmission along the first optical path; and said polarizer is oriented to transmit radiation polarized in the first direction while reflecting along the second optical path radiation which is linearly polarized in a direction orthogonal to the first direction, said device further comprising a second detector positioned in the second optical path to receive polarized radiation reflected by said polarizer.

19. The device of claim 1 further comprising a laser capable of providing linearly polarized radiation along the first optical path.

20. The device of claim 1 further comprising a $CO_2$ laser capable of providing radiation having a bandwidth centered at approximately 10.6 microns along the first optical path.

21. The device of claim 1 further comprising a $CO_2$ laser capable of providing radiation having a bandwidth centered at approximately 10.6 microns along the first optical path.

22. The device of claim 1 wherein the beam splitter is capable of receiving thermal radiation transmitted through all portions of the first aperture stop.

23. The device of claim 1 wherein said first, second and third optical paths each traverse the entire stop of the first aperture.

24. The device of claim 14 wherein:

the optical system is adapted to receive radiation linearly polarized in a first direction for transmission along the first optical path;

said polarizer is oriented to transmit radiation polarized in the first direction while reflecting along the second optical path radiation which is linearly polarized in a direction orthogonal to the first direction; and the beam splitter is capable of receiving thermal radiation transmitted through all portions of the first aperture stop.

25. The device of claim 24 wherein said first, second and third optical paths each traverse the entire stop of the first aperture.

26. The device of claim 24 wherein the detector array includes a detector element for receiving polarized radiation reflected from the target.

27. A thermal imaging and rangefinding device comprising:

an optical system including a first aperture having a stop of predeterminable size, said system including a first optical path for transmitting polarized radiation toward a target, a second optical path for receiving polarized radiation reflected from the target and a third optical path for receiving thermal radiation which can be processed to form an image, the first, second and third optical paths each passing through the first aperture;

a polarizer positioned to segregate the first and second optical paths;

a polarization modifier positioned along the first and second optical paths and between the first aperture and the polarizer; and a beam splitter, sensitive to spectral differences between the polarized radiation and the thermal radiation, positioned along the first optical path between the first aperture and the polarizer, said beam splitter capable of receiving thermal radiation transmitted through all portions of the first aperture stop.

28. The device of claim 27 wherein the polarizer is capable of receiving polarized radiation reflected from the target and transmitted through all portions of the first aperture stop.

29. The device of claim 27 wherein said first, second and third optical paths each traverse the entire stop of the first aperture.

30. The device of claim 27 wherein said beam splitter is oriented at an angle with respect to the first and second optical paths to segregate the third optical path from the first and second optical paths by reflecting thermal radiation which differs spectrally from the polarized radiation, and wherein the polarizer is capable of receiving polarized radiation reflected from the target and transmitted through all portions of the first aperture stop, said device further comprising:

an infrared imaging section positioned along the third optical path, said section including an infrared detector array and imaging optics positioned in the third optical path between said beam splitter and the detector array, said detector array including a detector element for receiving polarized radiation reflected from the target.

31. The device of claim 30 further including an afocal refractive telescopic system formed in combination with the the first aperture stop.

32. A method for performing thermal imaging and rangefinding functions with a single aperture system comprising the steps of:

forming first, second and third optical paths each having a common portion passing through an aperture with a stop of predetermined size, at least one of the optical paths capable of traversing the entire aperture stop;

linearly polarized radiation of predetermined orientation into the first path and transmitting said radiation through the aperture toward a target;

receiving polarized radiation reflected from the target through all portions of the aperture stop and into the second path; and receiving thermal radiation which can be processed to form an image through the aperture and into the third path.

33. The method of claim 32 further comprising the step of processing all radiation passing through the common portion of the optical paths with an afocal optical system.

34. The method of claim 32 further comprising the step of processing all radiation passing through the common portion of the optical paths with an afocal refractive lens system.

35. The method of claim 32 further comprising the steps of:

processing the reflected polarized radiation to acquire data related to the range of the target; and processing the thermal radiation to form an image.

36. The method of claim 35 wherein the step of processing the reflected polarized radiation includes converting the reflected radiation to a linear polarization of different orientation from the injected radiation.

37. The method of claim 36 wherein the converting step includes converting the injected radiation to circularly polarized radiation before transmitting the injected radiation through the aperture.

38. The method of claim 32 wherein the step of forming first, second and third optical paths includes reflecting thermal radiation which differs spectrally from the polarized radiation to segregate a segment of the third optical path from the first and second paths.

39. The method of claim 32 wherein the step of forming first, second and third optical paths is accomplished by:

converting the injected linearly polarized radiation into circularly polarized radiation before transmitting said radiation through the aperture toward the target; and converting the reflected radiation to a linear polarization of orientation different from the predetermined orientation of the injected radiation.

40. A method for performing thermal imaging and rangefinding functions with a single aperture system comprising the steps of:

forming first, second and third optical paths each having a common portion passing through an aperture with a stop of predetermined size, at least one of the optical paths capable of traversing the entire aperture stop;

injecting linearly polarized radiation of predetermined orientation into the first path and transmitting said radiation through the aperture toward a target;

receiving polarizing radiation reflected from the target through the aperture and into the second path; and receiving thermal radiation which can be processed to form an image through all portions of the aperture and into the third path.

* * * * *